US012589281B2

(12) United States Patent
Ngnoumen

(10) Patent No.: US 12,589,281 B2
(45) Date of Patent: Mar. 31, 2026

(54) DAMP CAP MANAGEMENT SYSTEM

(71) Applicant: AQIUS LLC, Dover, DE (US)

(72) Inventor: Ngassam Ngnoumen, Westport, CT (US)

(73) Assignee: AQIUS LLC, Dover, DE (US)

( * ) Notice: Subject to any disclaimer, the term of this patent is extended or adjusted under 35 U.S.C. 154(b) by 657 days.

(21) Appl. No.: 18/178,574

(22) Filed: Mar. 6, 2023

(65) Prior Publication Data

US 2023/0310942 A1 Oct. 5, 2023

Related U.S. Application Data

(60) Provisional application No. 63/326,855, filed on Apr. 2, 2022.

(51) Int. Cl.
*A63B 33/00* (2006.01)
*F26B 9/00* (2006.01)

(52) U.S. Cl.
CPC .............. *A63B 33/00* (2013.01); *F26B 9/003* (2013.01)

(58) Field of Classification Search
None
See application file for complete search history.

(56) References Cited

U.S. PATENT DOCUMENTS 1,252,333 A 1/1918 Engelberg
3,255,460 A 6/1966 Pastore

FOREIGN PATENT DOCUMENTS

CN 2219732 Y 2/1996
CN 105617620 A 6/2016
JP S63147111 U * 9/1988

* cited by examiner

*Primary Examiner* — Jason Lau
(74) *Attorney, Agent, or Firm* — Hard IP Professional Services LLC

(57) ABSTRACT

A damp cap management system (DCMS) for receiving, storing, drying, and transporting caps, coverings, and other applicable items. The DCMS may have a clam shaped case that can lay flat opened or be snapped shut securely. Inside flaps may be adjusted and stand at different angles, or lay flat, so caps can be installed on them to dry. The case and flaps may have apertures for ventilation and continuous air circulation even when the case is closed. The case may have internal motorized fan(s) for faster drying of the cap(s). The case may have a utility loop attached at the top and internal pocket(s). The flaps may be attached to a cross bar that runs across the length of the case at the bottom and is connected to stop plugs that fit into slots to enable the flaps to stand vertically when the case is opened and laid flat.

8 Claims, 9 Drawing Sheets

DAMP CAP MANAGEMENT SYSTEM

CROSS-REFERENCE TO RELATED APPLICATIONS

This application claims priority to U.S. Provisional Application No. 63/326,855, entitled "Novel Damp Cap Management System", and filed Apr. 2, 2022, the entirety of which is incorporated by reference.

TECHNICAL FIELD

The technical field of the disclosed embodiments generally relates to a system for managing caps. More specifically, it relates to a cohesive system for receiving, storing, drying, and transporting swim or damp caps and extending the life of the cap.

BACKGROUND

Bathing caps have been used by swimmers for hundreds of years. In Roman times, women wore hair nets made from waxed taffeta, or synthetic silk, to keep their hair from getting damp.

Early modern swim caps used for wet activities looked like aviator helmets with chin straps to hold them in place. By the 1920s the popularity of latex led to the production of stretchy swim caps that fit right in with the styles of the day. During World War II, the availability of swim caps became limited when rubber was widely used to make war materials and such caps became sparse.

As public health awareness began to grow in the 1970s, public swimming pools had established strict rules requiring people to wear swim caps. Durable and resilient silicone swim caps were introduced in more recent years and are considered now to be the most popular of its kind.

Swim caps today are used by swim athletes and recreational swimmers to reduce drag and protect their hair from harsh chemicals in the pool. Caps are also used in other water activities like water polo.

Growing interest in competitive swimming in the 1980s and 1990s led to a surge in swim cap production. Competition swim caps are available today in many styles, materials, and colorful and unique prints. With the increased popularity of swimming, the industry has begun developing bags to store them.

Today, swimmers may dry their cap with their towels and then shove the damp caps into their towels to dry or into their damp mesh bags. When they get home, the caps may remain crumpled up in their bags, shoved into a drawer, or even worse, stay in the damp towel. None of these approaches help dry a damp cap efficiently and without enabling damage to the cap. These approaches also do not allow a user to transfer a damp cap conveniently to a device right after swimming to begin drying the cap or safely store it without further damage to the cap.

With the increased participation in swimming and water related activities e.g., water polo, there is a need to have a way to effectively dry and safely store damp or swim caps. There is also a need to have a one stop, convenient solution and a transportation option that matches the on-the-go lifestyle of people. Finally, with the significant money spent on sports gear and items, people and athletes want to get more for their money and have items they buy last longer.

SUMMARY

Disclosed are various embodiments of a damp cap management system (DCMS) that provides a solution to the shortcomings in the prior art for storage of a damp or swim cap. Such caps can include those used for water activities, e.g., swimming and water polo or applicable items requiring holding, drying, storage, transportation, and management.

In an embodiment, The DCMS may have a clam shaped case that can lay flat when in an open position or be snapped shut securely in a closed position. Internal drying flaps may be adjusted to stand at different angles, or lay flat, so caps can be installed on them to dry. The case, as well as the drying flaps, may have apertures for ventilation and continuous air circulation even when the case is closed. The case may also include internal motorized fan(s) for faster drying of the cap(s).

A drying flap may be attached to a cross bar that runs across the length of the bottom of either half of case, the cross bar including stop plugs that fit into slots to enable the flaps to stand vertically at different angles when the case is opened and laid flat. Each half of the case may include a drip reservoir to collect dripping water from wet caps as they dry.

The case may have a utility loop attached at the top for easy attachment to a bag, piece of gear, or a user's wearable accessory. Storage pocket(s) may also be provided inside the case.

An object of the DCMS is to efficiently dry swim and damp caps and also extend the life of the caps through proper management and storage. Swim caps are generally made of rubber or rubber-like materials such as latex and silicone which can become deformed when folded for extended periods. The current disclosure with flaps allows said caps to remain flat and maintain their shape when in storage.

Another object is to provide a means to minimize deterioration of swim and damp caps. It is well-known that such rubber or cap materials can become brittle and pitted when exposed to petroleum products, such as oils, and pathogens, such as bacteria and fungi, when stored damp.

The DCMS may be continuously ventilated and allow moisture to evaporate away from the cap when stored over time. The DCMS may also prevent caps from coming into contact with foreign substances or items.

Another object is to allow users to dry their swim and damp caps in ambient air. The DCMS has internal drying flaps that can be extended at various angles to hold caps in a vertical fashion, thereby allowing said caps to dry while being transported, stored, or not in use.

Another object is to allow users to dry their swim and damp caps more quickly. The DCMS case has apertures for continuous air circulation and drying. The DCMS may have motorized fans to help further accelerate the drying of the caps when they are switched on.

Another object is to allow users to safely store their swim and damp caps when they are not in use. The caps may be stored in a manner that minimizes damage to the cap as the DCMS case and flaps also prevent caps from coming in contact with other damaging items.

Another object is to allow the case to be secure when a swim or damp cap is inside. The case may include a snap lock that allows the case to remain shut when the DCMS is filled with caps.

Another object is to allow a swim or damp cap to be securely transported from one location to another. The case and flap may hold the damp cap in place during transit.

Another object is to provide a utility loop. This utility loop allows a user to affix the DCMS to another item such as a backpack or clothesline by means of, for example, a carabiner, etc. The utility loop can also be used to affix a carry strap and the like, so the consumer can carry or wear the DCMS independently as a piece of gear (to the pool side) and also add attachments, e.g., a goggle case.

Another object is to provide a device that can help with receiving, storing, drying, or transporting swim caps or damp caps or coverings that can have logos, brands, and writings on them. The surface of the case, flaps, and other areas allow these options.

Another object is to provide a single device that addresses multiple use cases that include receiving, storing, drying, transporting, and preserving the life of a swim or damp cap.

The DCMS offers convenience and ease of use for users so they don't have to have multiple devices or bulky devices or difficult to use devices that address all the uses cases listed above.

Another object is to provide a device that is a consumer gear and addresses receiving, storing, drying, transporting, and preserving the life of a damp cap. The DCMS is not required to reside permanently in one location e.g., at home, as simply a storage device. The case can be carried in a user's bag or worn independently by the user in addition to being a device that can reside in a single place without being transported.

Another object is to provide a device that is wearable and addresses receiving, storing, drying, transporting, and preserving the life of a damp cap. The utility loop on the DCMS allows a user to attach a wrist strap and wear the DCMS independently. The DCMS cases can have pockets to hold items as well.

Other methods, applications, and systems adapted to the task may be configured to carry out the various described features and are therefore considered to be within the scope and intent of the various embodiments and claims.

The objects, features, and advantages of the various embodiments, as well as the advantages thereof, which will become apparent from the description are accomplished by the improvements described and shown in the drawings.

Other aspects shall be more readily understood when considered in conjunction with the accompanying drawings, and the following detailed description, neither of which should be considered limiting.

DETAILED DESCRIPTION

In an embodiment, a damp cap management system (DCMS) provides a cohesive system for receiving, storing, drying, and transporting swim and damp caps and extending the life of the caps.

Figure 1:
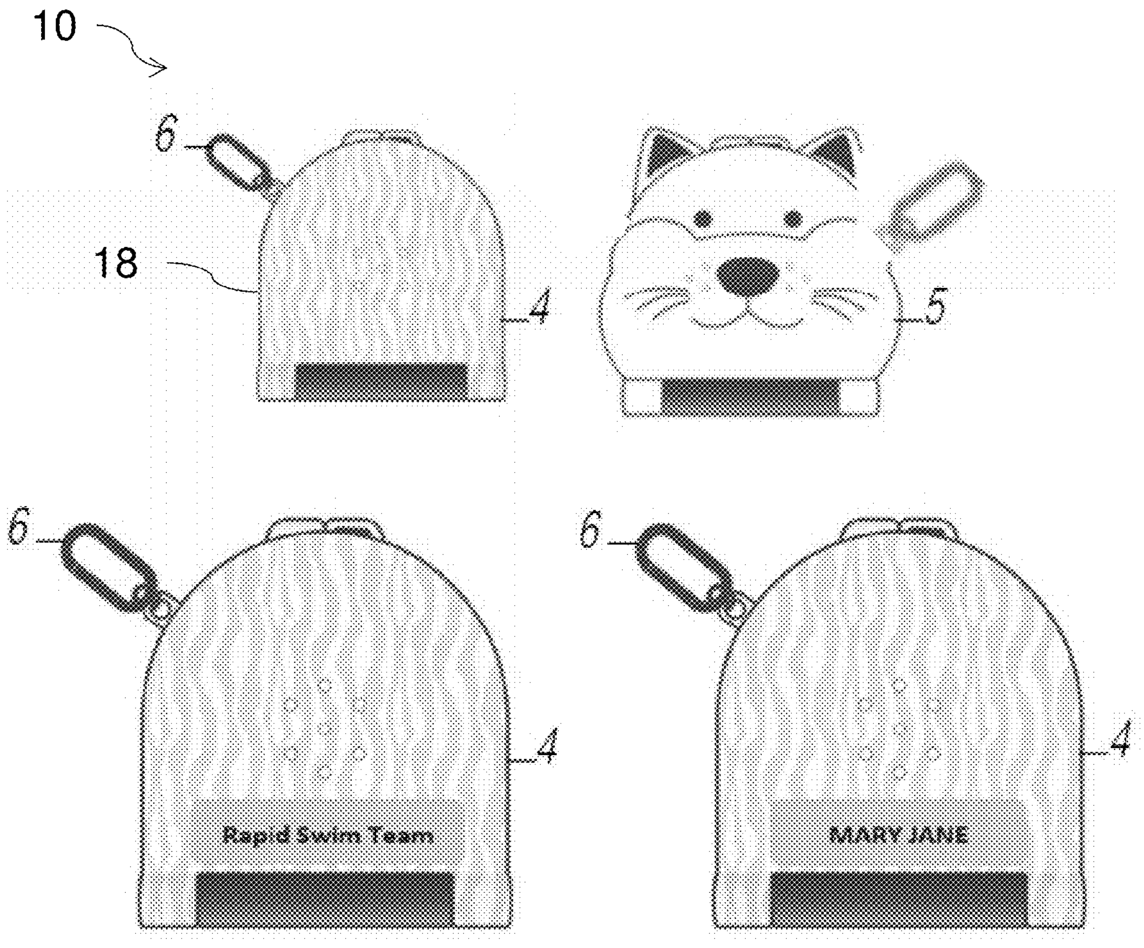
FIG. 1 shows perspective views of examples of a damp cap management system (DCMS) according to various embodiments.

FIG. 1 shows a perspective view of the DCMS 10 according to an embodiment having a clam shell shape with a case 18 including an upper half 4 and a lower half 5. Other embodiments of the case can include a multitude of shapes such as but not limited to a cat face, dog face, flat, and the like, and being made of a lightweight plastic according to an embodiment, although other suitable material may be used.

The case may be branded with logos, names, marketing messages, and the like. FIG. 1 shows exemplary cases in a closed position and stood up or laid down on a flat surface. A utility loop 6 may be used to attach the DCMS 10 to anything that allows an attachment, such as a bag, a piece of gear, or a wrist strap or other wearable accessory. In an embodiment, wearing the DCMS with a wrist strap would allow a swimmer take the DCMS to the pool side for convenience before getting into the pool and also attach other items to the DCMS, e.g., a goggle case.

Figure 2A:
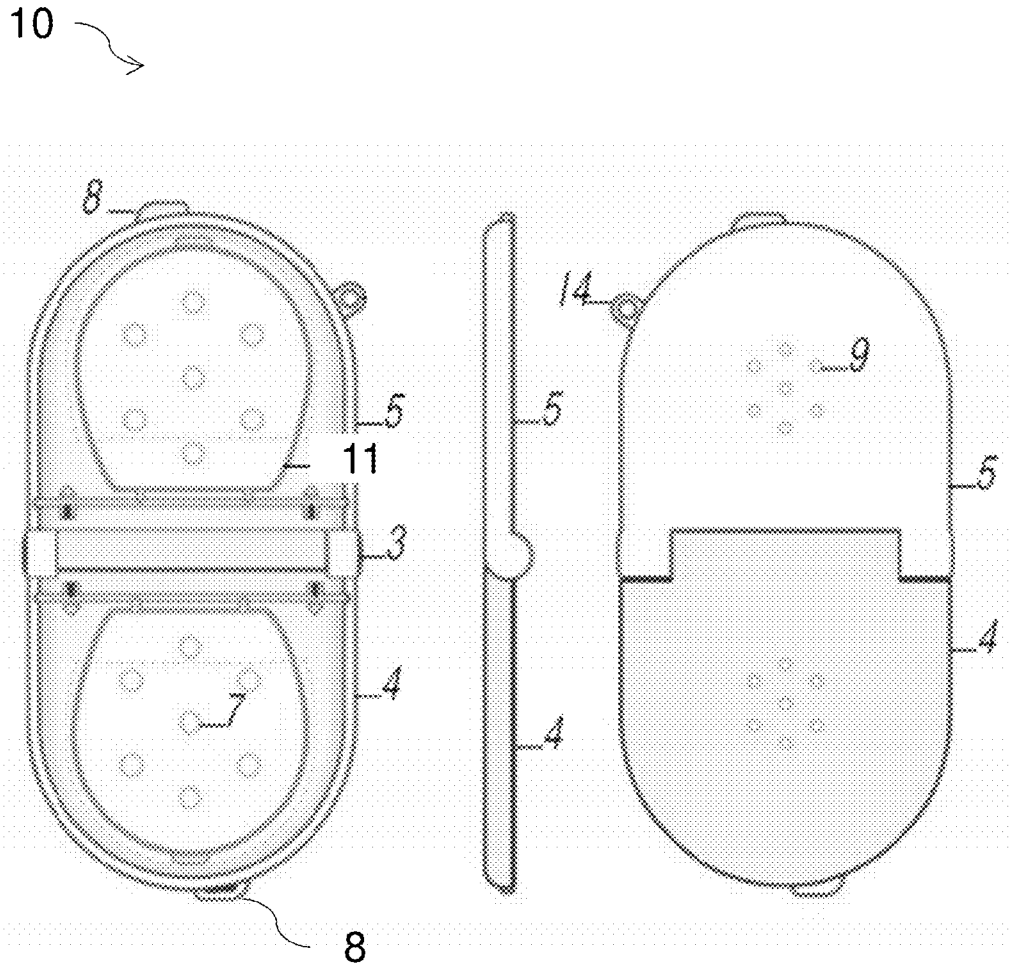
FIG. 2A is a plan view of a DCMS according to an embodiment in an open position.

FIG. 2A shows an open view of an embodiment of the DCMS having mating snap locks 8 and generally circular-shaped drying flaps 11 with evaporation apertures 7. Each half of the case may include vent apertures 9 and one or both halves may include an attachment point 14 for the utility loop 6. The upper half 4 and lower half 5 may be connected by hinge assembly 3 to allow them to pivot.

Figure 2B:
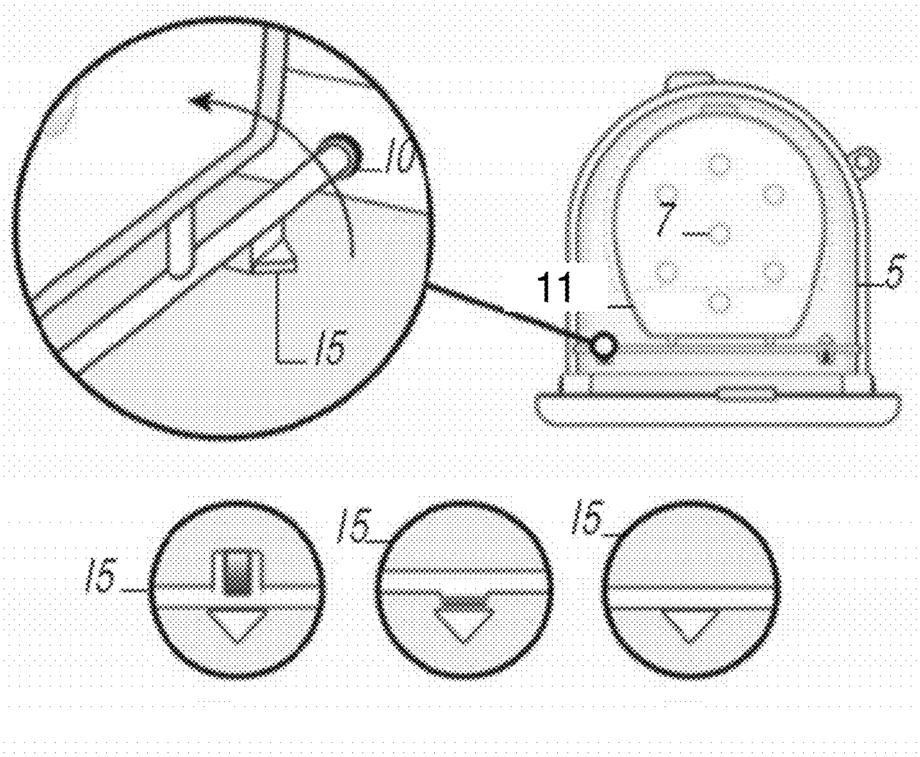
FIG. 2B is an elevation view of the DCMS of FIG. 2A partially opened.

FIG. 2B shows the drying flaps 11 are also be pivotably connected to the case 18 by a cross bar 10 with stop plugs 15 that selectively engage with corresponding slots in the case, thereby allowing the drying flaps to remain in a vertical position. The apertures 7 and 9 on the flap 11 and case halves, respectively, allow air ventilation of the caps even when the case is shut or is being transported. Case halves 4 and 5 can lay flat when the case is open, allowing for placement on a surface, and enable the user to raise the flaps at different angles. This allows the DCMS to be used to dry caps in a stationary place as caps are put on the flaps that are raised vertically.

Figure 2C:
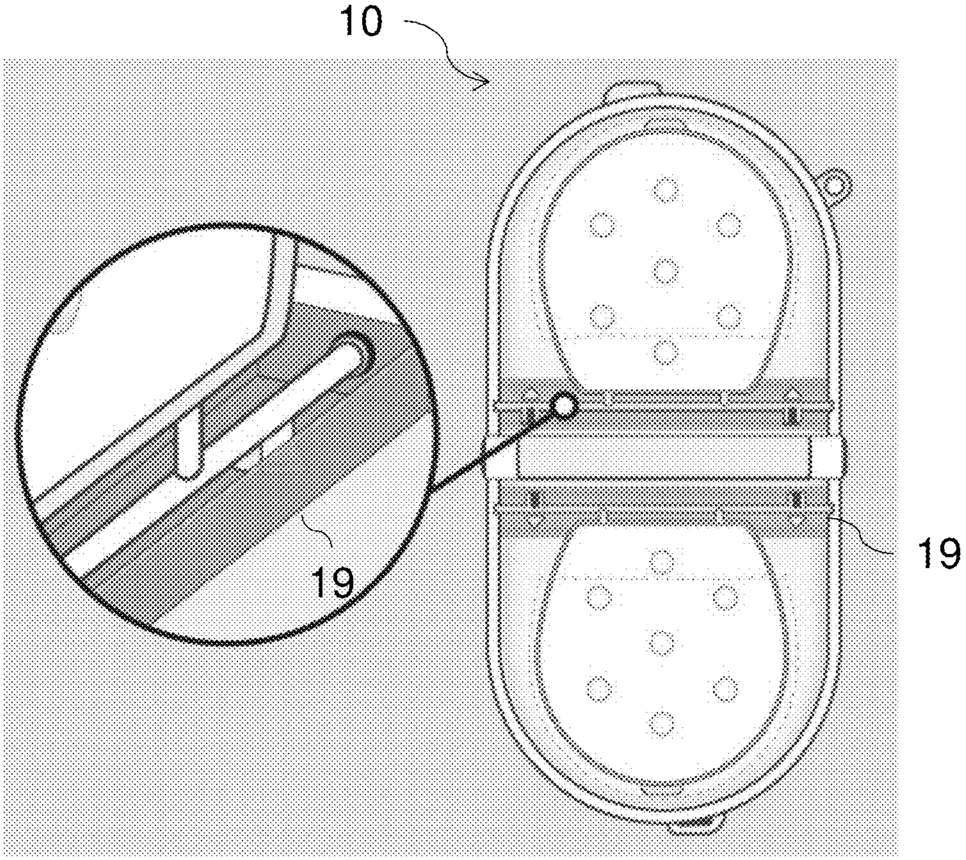
FIG. 2C is a plan view of a DCMS including a drip reservoir according to an embodiment.

A drip reservoir to collect water may be provided in the case adjacent the hinge assembly area 3. FIG. 2C shows an alternative embodiment in which each half of the case may include a drip reservoir 19 to collect dripping water from wet caps as they dry.

Figure 3A:
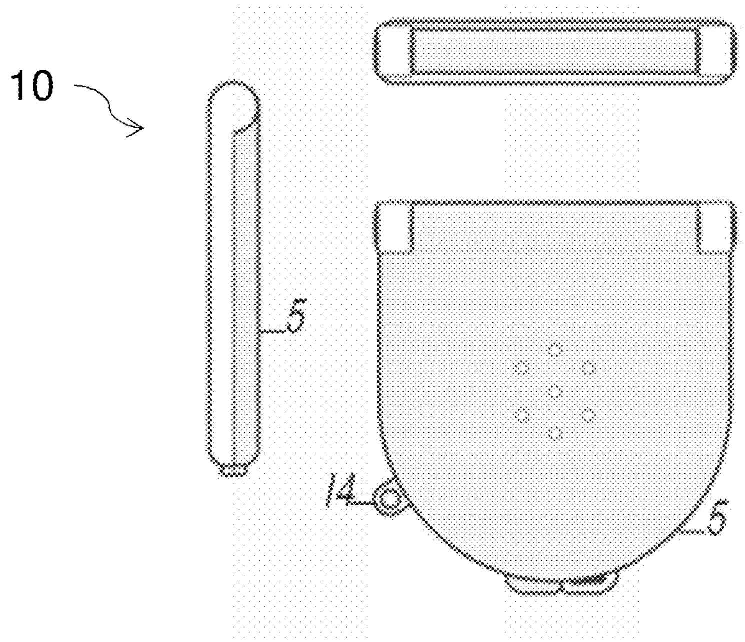
FIGS. 3A-D are views a DCMS according to an embodiment in different positions and alternative embodiments with an attached accessory and pocket.
Figure 3B:
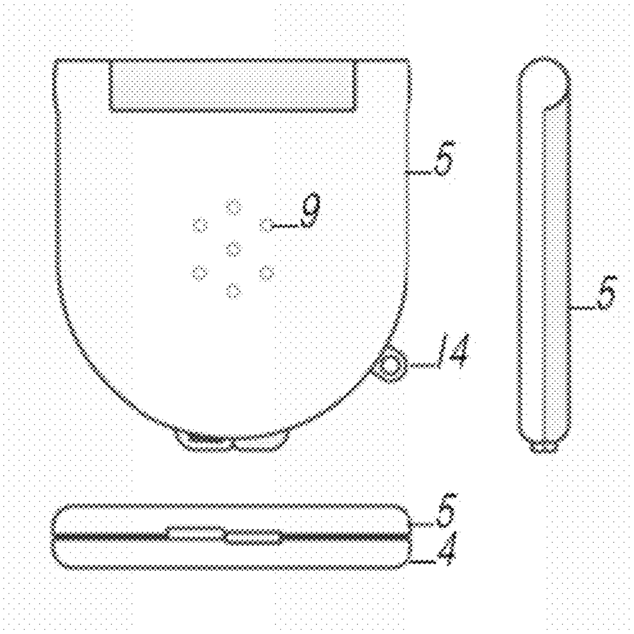
Figure 3C:
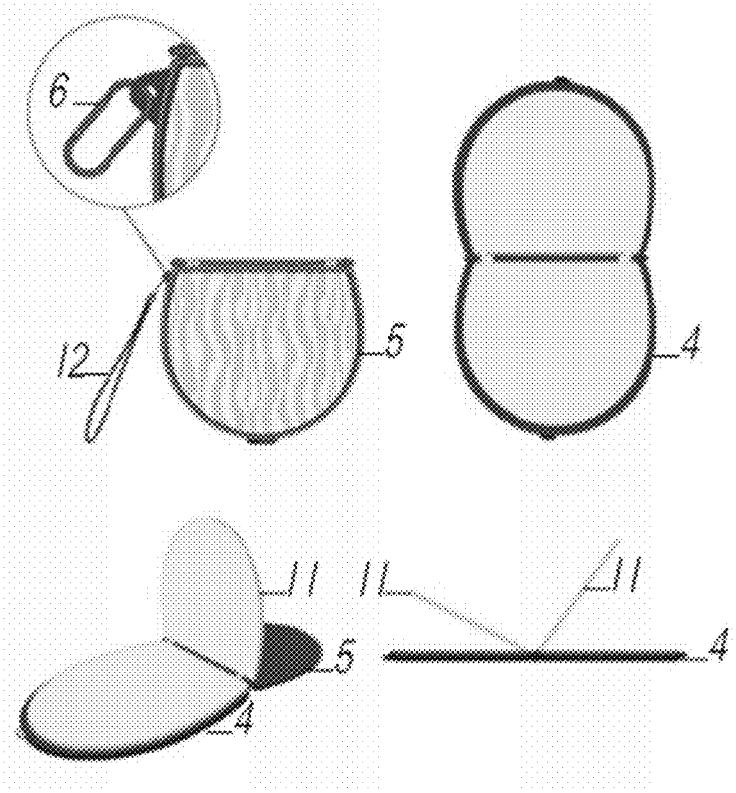
Figure 3D:
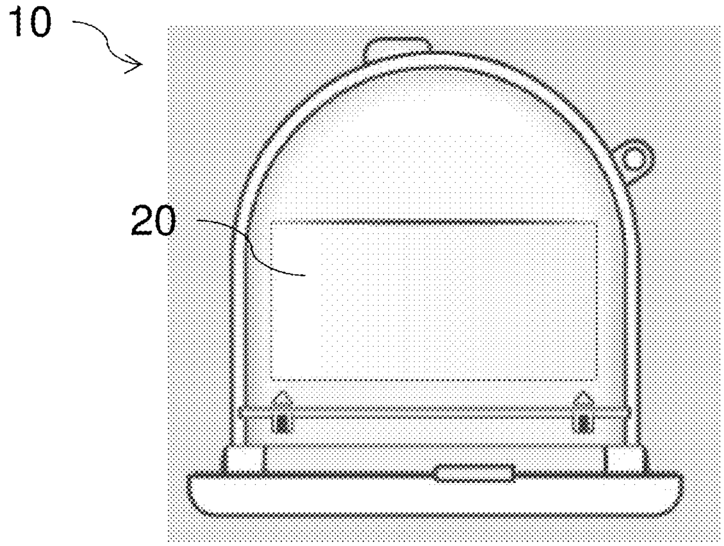

FIGS. 3A and 3B show other of the DCMS 10 in a closed position. FIG. 3C shows the DCMS with the case 18 and drying flaps 11 in different positions and with an accessory (wrist strap 12) affixed to the carabiner 6. Other embodiments of the DCMS may have pocket(s) 20 provided on the inside or outside of the case to store personal belongings, as shown in FIG. 3D.

Figure 4:
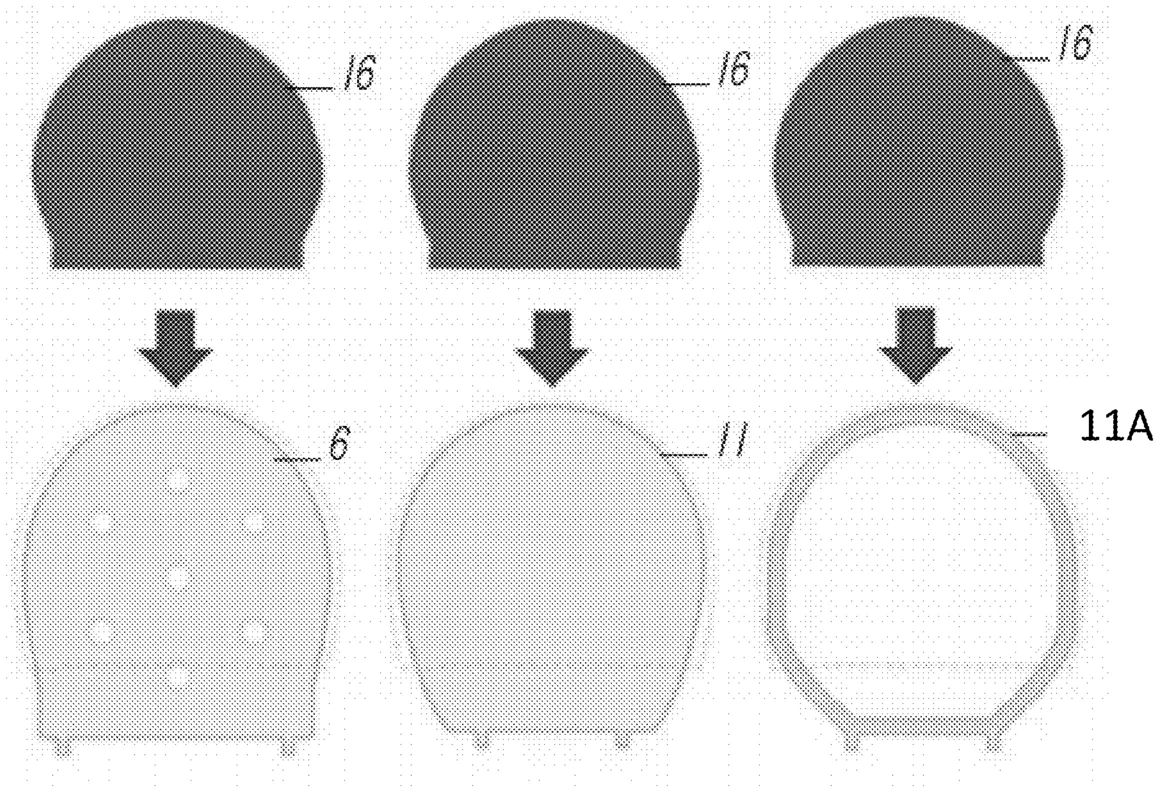
FIG. 4 is a perspective views of examples of the DCMS according to various embodiments.

FIG. 4 show a side view of the DCMS flap embodiments with a swim or damp cap 16 installed on different embodiments of drying flaps 11 with and without apertures as well as a hollow flap 11A. The drying flaps 11 and 11A may also be made of a lightweight plastic or other suitable material.

Figure 5:
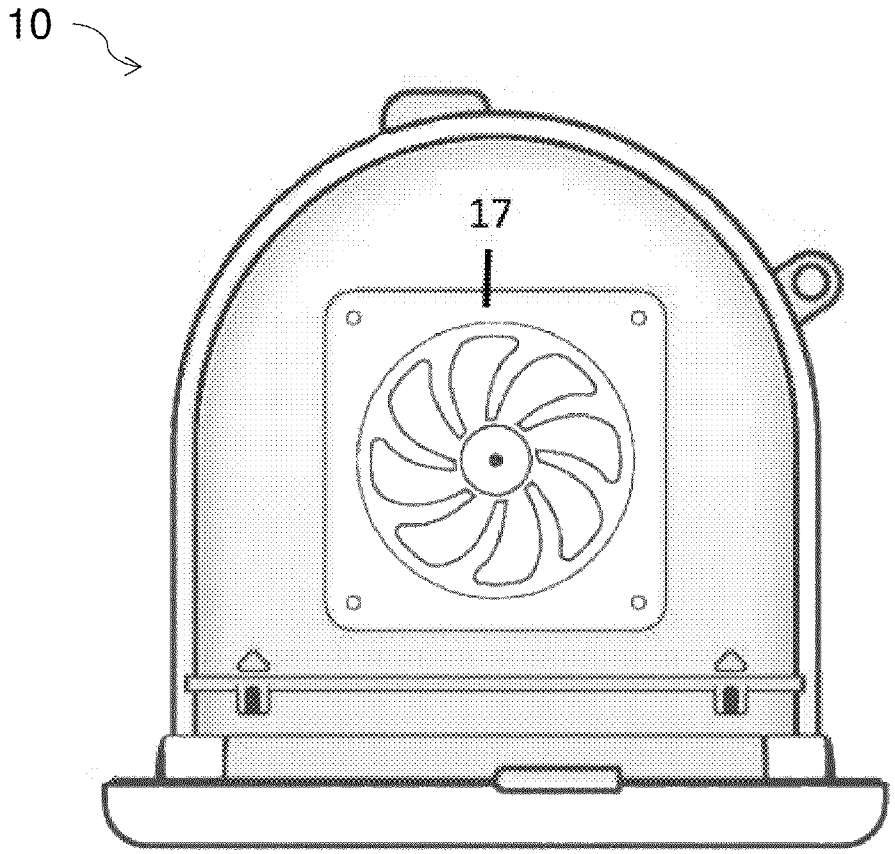
FIG. 5 is a perspective view of an example of the DCMS according to various embodiments.

FIG. 5 shows an elevated view of a DCMS according to an embodiment including a motorized fan 17 that can be turned on or off as needed.

It is to be understood that the phraseology and terminology employed herein are for the purpose of description and should not be regarded as limiting. For example, the use of the articles "a," "an," or "the" is not to be construed as limiting the element to the singular. Further, the use of directional descriptors such as "up", "upward", "down", "downward", "front", "back", "top", "upper", "bottom", "lower", "left", "right" and other such terms refer to the device as it is oriented and appears in the drawings and are used for convenience only; they are not intended to be limiting or to imply that the device has to be used or positioned in any particular orientation.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

With respect to the above description, it is to be understood that described embodiments are not limited in its application to the details of construction and to the arrangement of the components in the following description or illustrations in the drawings. Other embodiments may be carried out in various ways and used with other items.

As such, those skilled in the art will appreciate that the conception upon which this disclosure is based may readily be utilized as a basis for the designing of other structures, methods, and systems for carrying out the several purposes of the present disclosed device.

The invention claimed is:

1. A cap storage apparatus comprising:
- a case having an inner surface and including
  - a first half having a body including a plurality of ventilation apertures and bottom end;
  - a second half having a body including a plurality of ventilation apertures and a bottom end, the first half and second half having corresponding shapes;
- a hinge, wherein the bottom end of each of said halves is rotatably connected to the hinge;
- a cross bar rotatably connected to the inner surface of the case adjacent the hinge and including one or more stop elements to secure the cross bar at an angle of rotation;
- a drying flap including
  - a top portion having a shape corresponding to a cap, and
  - a bottom portion connected to the cross bar; and
- a securing element configured to secure the halves together in a closed position.

2. The apparatus of claim 1, wherein the cross bar comprises a first cross bar rotatably connected to the first half and the drying flap comprises a first drying flap, and further comprising:
- a second cross bar rotatably connected to the second half adjacent the hinge and including one or more stop elements to secure the second cross bar at another angle of rotation; and
- a second drying flap including
  - a top portion having a shape corresponding to a cap, and
  - a bottom portion connected to the second cross bar.

3. The apparatus of claim 1, wherein the securing element comprises a first locking element positioned on the first half and a second locking element positioned on the second half configured, and wherein the first locking element and second locking element are configured to lock the first and second halves together in closed position.

4. The apparatus of claim 1, wherein the drying flap includes a plurality of ventilation apertures.

5. The apparatus of claim 1, further comprising a motorized fan attached to an interior surface of the first half adjacent to the plurality of ventilation apertures.

6. The apparatus of claim 1, wherein each of the first and second halves comprises a drip reservoir on the bottom portion of each of said halves.

7. The apparatus of claim 1, further comprising an accessory attachment element on an outer perimeter of the case.

8. The apparatus of claim 1, further comprising a pocket on the inner surface of the case.

* * * * *